(12) United States Patent
Aizawa et al.

(10) Patent No.: US 6,752,633 B2
(45) Date of Patent: Jun. 22, 2004

(54) ELECTRICAL CABLE TERMINAL PART STRUCTURE AND TREATMENT METHOD

(75) Inventors: Masayuki Aizawa, Kanagawa (JP); Takaki Naito, Kanagawa (JP)

(73) Assignee: Tyco Electronics. AMP, K.K., Kanagawa (JP)

( * ) Notice: Subject to any disclaimer, the term of this patent is extended or adjusted under 35 U.S.C. 154(b) by 0 days.

(21) Appl. No.: 10/004,052

(22) Filed: Oct. 24, 2001

(65) Prior Publication Data

US 2002/0050386 A1 May 2, 2002

(30) Foreign Application Priority Data

Oct. 27, 2000 (JP) ..................................... 2000-328598

(51) Int. Cl.[7] .............................................. H01R 12/00
(52) U.S. Cl. ...................................... 439/63; 439/579
(58) Field of Search ........................ 439/98, 99, 610, 439/932, 63, 497, 579, 581

(56) References Cited

U.S. PATENT DOCUMENTS

| | | | |
|---|---|---|---|
| 3,980,382 A | | 9/1976 | Reeder ................... 339/177 R |
| 4,682,840 A | * | 7/1987 | Lockard ..................... 439/874 |
| 5,371,322 A | * | 12/1994 | Selmeski ................... 174/84 R |
| 5,470,253 A | * | 11/1995 | Siems et al. ................. 439/491 |
| 5,478,258 A | * | 12/1995 | Wang ......................... 439/581 |
| 5,547,395 A | | 8/1996 | Delamotte .................. 439/578 |
| 6,380,485 B1 | * | 4/2002 | Beaman et al. ........... 174/88 R |

FOREIGN PATENT DOCUMENTS

| | | | |
|---|---|---|---|
| GB | 1 508 997 | 4/1978 | ............ H05K/1/10 |
| JP | 56-24447 | 6/1981 | |
| JP | 10-223051 | 8/1998 | |

* cited by examiner

Primary Examiner—Rene Luebke
Assistant Examiner—Ann McCamey

(57) ABSTRACT

The invention relates to an electrical cable for termination to an electrical component and method for termination that minimizes the mismatching of the differential impedance of a terminal part from which a shielding covering of an electrical cable has been stripped in a cable consisting of two differential transmission signal wires, a drain wire and a shielding covering that covers the electrical wire. Accordingly, a plastic heat-shrink tube is caused to adhere tightly to the terminal part and shielding covering, except for the stripped front end portion of the terminal part, so that the front end portion is exposed. As a result, the heat-shrink tube prevents or alleviates the mismatching of the differential impedance.

13 Claims, 4 Drawing Sheets

ELECTRICAL CABLE TERMINAL PART STRUCTURE AND TREATMENT METHOD

BACKGROUND OF THE INVENTION

The present invention relates to an electrical cable that is terminated to an electrical component and a method for preparing such cable for termination. More specifically, the invention is related to an electrical cable and method for termination for high-speed signal transmission.

DESCRIPTION OF THE PRIOR ART

Shielded electrical wire cable and coaxial cable are commonly used for high-speed signal transmission, and more specifically, high-speed digital differential transmission. However, the method and structure by which these cables are terminated to the components can vary. In one conventional termination structure, disclosed in Japanese Patent Application Kokai No. H10-223051, the intermediate portions of two sheet-form shielded electrical wires are bundled into a single unit by means of a tape or heat-shrink tube. Both end portions of the wires, exposed for the purpose of branching, are shielded by shielding layers of the respective electrical wires themselves. In another conventional structure, disclosed in Japanese Patent Application Kokoku No. S56-24447, a coaxial cable wrapped with a cordel braided insulator is stripped when a metal contact plug fastening fitting is attached to the terminal part of the coaxial cable. The exposed inner conductor is covered with a tightly adhering heat-shrinkable plastic tube to form a dielectric layer. The length and thickness of the dielectric layer can be arbitrarily set in order to adjust the characteristic impedance of the internal conductor.

In the first recited reference the end portions of the shielded electrical wires are merely shielded in the shielded electrical wire terminal treatment structure and, therefore, impedance matching cannot be maintained. Further, because impedance matching is accomplished by means of a heat-shrink tube in the coaxial cable method, recited in the second reference differential transmission signal wires are not accounted for. Thus, in these conventional methods, the individual differential transmission signal wires and drain wire from which the shielding covering has been stripped are generally connected to a corresponding circuit board, etc., in a loose state, i.e., in a state in which the positional relationship of the electrical wires is not maintained. The end portion of the shielding covering and the portion of the drain wire that is exposed from the end portion are separately covered by tightly adhering heat-shrink tubes. For that reason, the characteristic impedance of the exposed differential transmission signal wires is not matched causing problems such as signal reflection and signal deviation. This terminal treatment is expensive and time consuming.

It is therefore desirable to develop an inexpensive electrical cable structure and method where the matching (balance) of the differential impedance between the two differential transmission signal wires and the drain wire is maintained so that there is little signal reflection when the cable is terminated to an electrical component. It is also desirable to develop a structure and method that is suitable for use in high speed transmission and prevents deterioration of the transmission characteristics by eliminating skewing (propagation delay time difference, i.e., signal deviation) between the two signal wires.

SUMMARY OF THE INVENTION

The invention relates to an electrical cable terminal part structure having two differential transmission signal wires. An insulator covers the respective core wires. A single drain wire is disposed adjacent to the differential transmission signal wires at an equal distance from each of the differential transmission signal wires. A shielding covering surrounds the wires. The area around the two differential transmission signal wires and the drain wire are exposed at a terminal part or front end of the electrical cable by stripping the shielding covering. Except for the exposed front end portions of the differential transmission signal wires and drain wire, the area around the two differential transmission signal wires and the drain wire is covered by a heat-shrink tube together with the end portion of the shielding covering, so that mutual distances between the wires inside the cable are maintained.

This invention also relates to a method in which the two differential transmission signal wires and the drain wire are exposed by stripping the shielding covering at the terminal part or termination end of the electrical cable. The area around the two differential transmission signal wires and the drain wire that are exposed is covered with a heat-shrink tube together with the end portion of the shielding covering. Only the front-end portions of the differential transmission signal wires and drain wire remain exposed so that mutual distances between the wires inside the electrical cable are maintained.

BRIEF DESCRIPTION OF THE DRAWINGS

The invention will now be described by way of example with reference to the accompanying drawings wherein.

DETAILED DESCRIPTION OF THE PREFERRED EMBODIMENT

Figure 1:
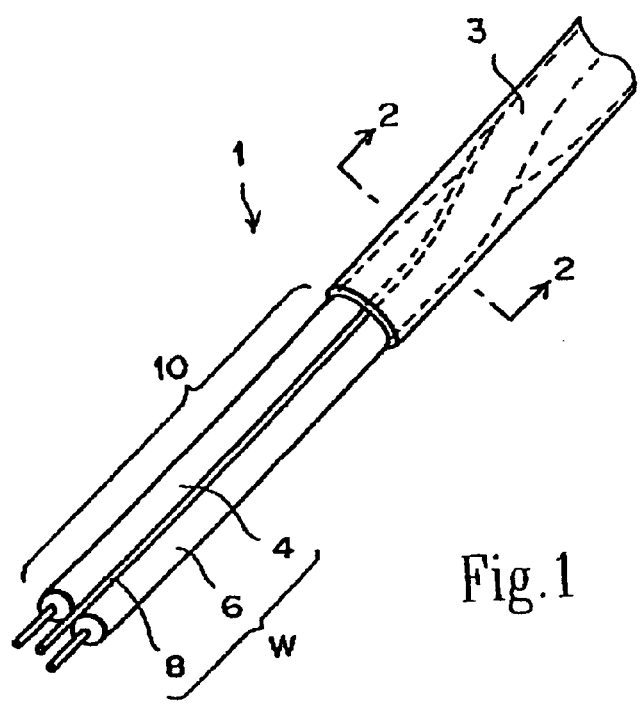
FIG. 1 is a perspective view of a cable terminal part where a shielding covering has been partially stripped away.

FIG. 1 shows an electrical cable 1, generally known as a shielded twisted pair cable, suitable for use in high-speed digital differential transmission. The cable 1 has three electrical wires W disposed inside a shielding covering 3. The cable 1 is stripped to expose the end portions 10 of the electrical wires W, i.e., the end portions 10 of the signal wires 4 and 6 and drain wire 8, over a given length. The end portion of the shielding covering 3 is stripped by holding an end portion 10 of the cable 1 with a holding tool (not shown).

As a result of the stripping, in the case of the signal wires 4 and 6, the impedance between the exposed end portions 10 and the portions of the signal wires 4 and 6 that are inside the shielding covering 3 is no longer matched. The method used to adjust the impedance will be described later.

Figure 2:
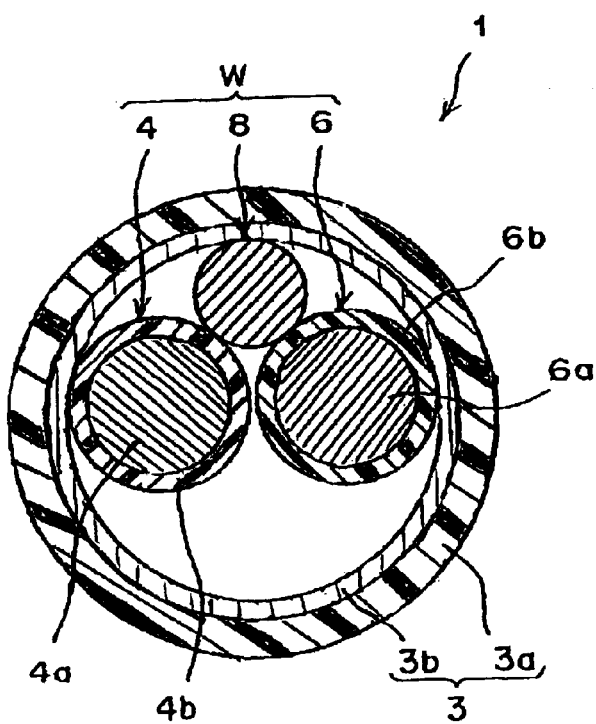
FIG. 2 is a cross-sectional view of the cable terminal part taken along the line 2—2 of FIG. 1.

FIG. 2 shows the internal structure of the cable 1 in a region where the cable has not been stripped. The shielding covering 3 has an insulating outer layer 3a that consists of a polyester film. An aluminium foil (ground conductor) 3b covers the inside surface of the outer layer 3a. The three electrical wires W that are disposed inside the aluminium foil 3b consist of differential transmission signal wires 4 and 6 and a drain wire 8. The differential transmission signal wires are signal wires which are devised so that signals are transmitted by inputting voltages whose phases are reversed into two transmission wires. The three electrical wires W are twisted together and disposed inside the shielding covering 3 of the cable 1. The signal wire 4 and signal wire 6 have respective core wires 4a and 6a covered with an insulating outer covering 4b and 6b consisting of a polyolefin-type resin.

The drain wire 8 is a naked electrical wire and may be a single wire or a plurality of copper wires twisted together to form a single wire. The drain wire 8 is positioned in close proximity to the signal wires 4 and 6, and at an equal distance from each of the signal wires 4 and 6. Equal distance includes cases in which the distances are slightly different due to dimensional error or manufacturing error of the electrical wire or deformation, etc., of the electrical wires, in addition to cases in which the distances are completely identical. The distances of the three electrical wires W from each other are maintained as fixed distances inside the shielding covering 3. Specifically, the drain wire 8 is located in a position that is separated from the core wires 4a and 6a of the signal wires 4 and 6 by a distance corresponding roughly to the thickness of the outer coverings 4b and 6b of the core wires 4a and 6a.

The sectional view shown in FIG. 2 indicates the theoretical shape of the cable structure. In actuality, however, because of dimensional error, manufacturing error or deformation, etc., of the members, the positional relationship is not accurately maintained as a fixed relationship. Further, the drain wire 8 is accommodated in a state in which the drain wire 8 contacts the aluminium foil 3b. The signal wire 4 and signal wire 6 constitute so-called called equilibrium wires which are loaded with a voltage so that the magnitude of the voltage is equal and of opposite polarity with respect to the ground point in an arbitrary cross section.

Figure 3:
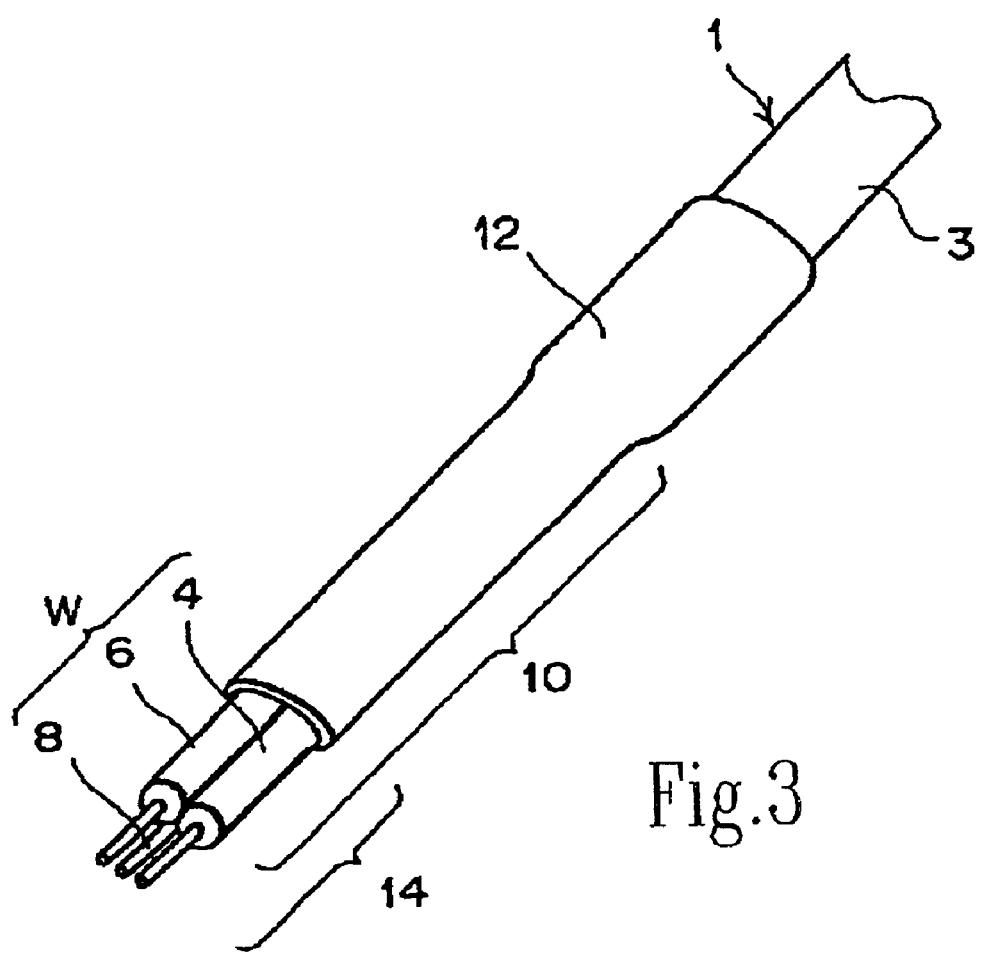
FIG. 3 is a perspective view of the cable terminal part shown in FIG. 1 where the electrical cable is tightly covered by a heat-shrink tube.

Because the impedance of the exposed terminal part 10 of the cable 1 is mismatched with the impedance of the signal wires 4 and 6 inside the shielding covering 3 of the cable 1, a plastic heat-shrink tube 12 is caused to adhere tightly to the terminal part 10 and shielding covering 3 (FIG. 3). The front-end portion 14 of the terminal part 10, however, remains exposed. The plastic shrink tube 12 maintains equal distances between the drain wire 8 and the respective signal wires 4 and 6. As a result, the heat-shrink tube 12 prevents or alleviates mismatching of the differential impedance and maintains the balance among the electrical wires W, eliminating skewing, i.e., signal deviation, between the signal wires 4 and 6. Further, since impedance mismatching can be kept to a minimum, reflection is reduced.

The connection of the cable terminal part to an electrical component, i.e., a circuit board, will be described with reference to FIGS. 4 and 5. The exposed front-end portions 14 of the signal wires 4 and 6 are disposed on a first side, i.e., an upper side 20, of a board 16. The drain wire 8 is disposed on a second side, i.e., an underside 22, of the board 16. In this case, since the signal wires 4 and 6 and drain wire 8 are flexible, the wires can be divided between the upper and lower surfaces of the board 16. The drain wire 8 and the exposed core wires 4a and 6a of the signal wires 4 and 6 are then respectively fastened by soldering to conductive pads 24, 18, 18. The conductive pad 24 is positioned at an intermediate point between the conductive pads 18, 18 on the opposite side of the board 16 (FIG. 5).

Figure 4:
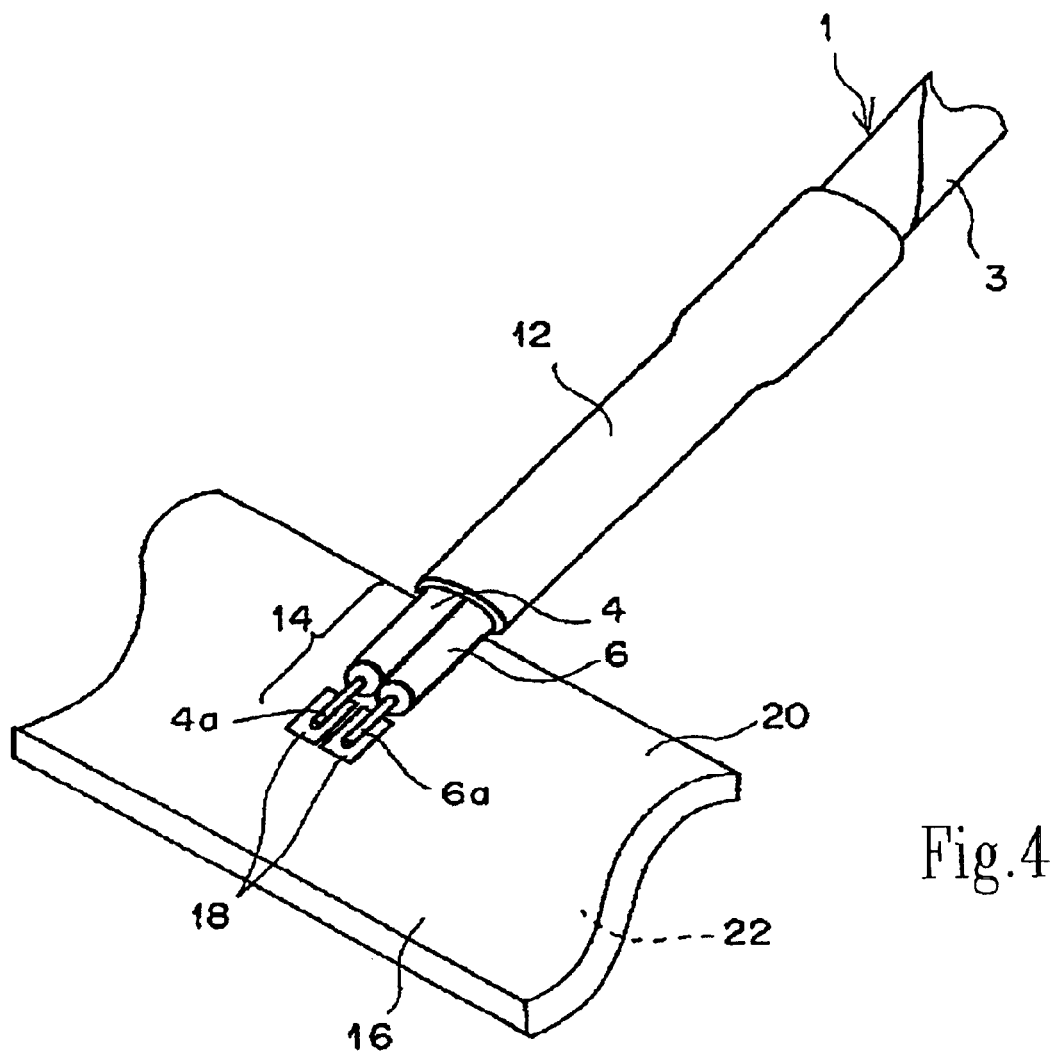
FIG. 4 is a perspective view showing signal wires connected to conductive pads on one side of a board.
Figure 5:
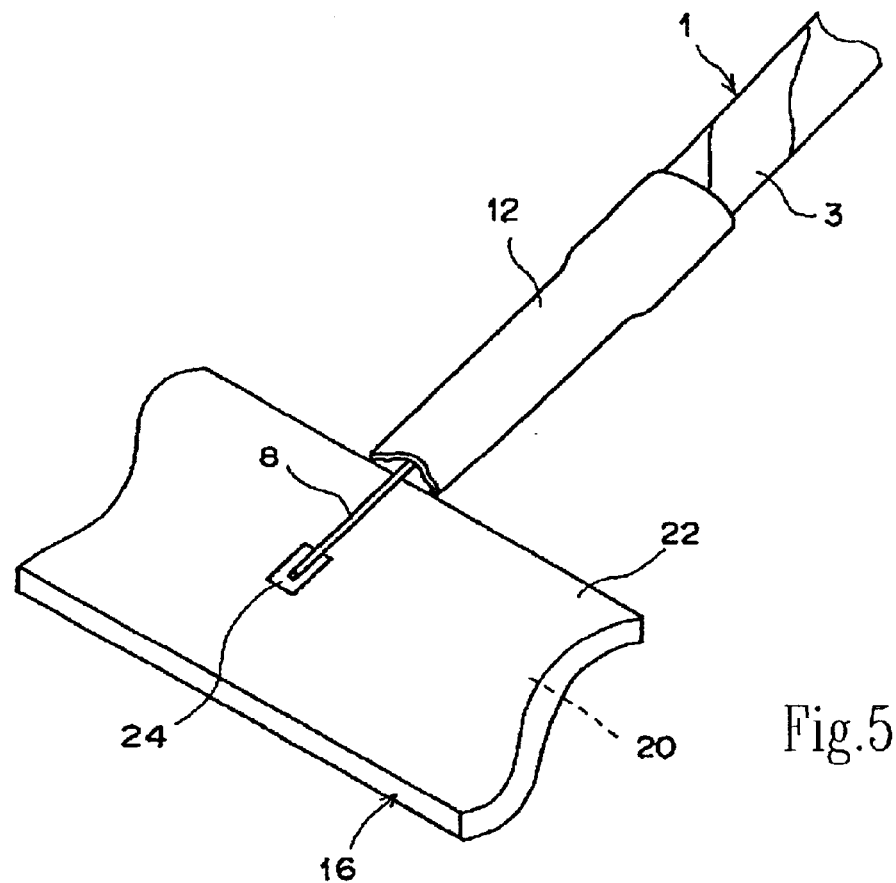
FIG. 5 is a perspective view showing a drain wire connected to the conductive pad on a second side of the board.

In FIGS. 4 and 5, only one cable 1 is shown for purposes of description. In actuality, however, a plurality of cables are lined up side by side, with the connecting parts of the signal wires 4 and 6 and drain wire 8 alternating between the first side 20 and the second side 22 of the board 16. Adjacent cables 1 are connected to the conductive pads 18 so that the same polarities (phases) are adjacent to each other between the respective cables. As a result, crosstalk can be prevented.

Figure 6:
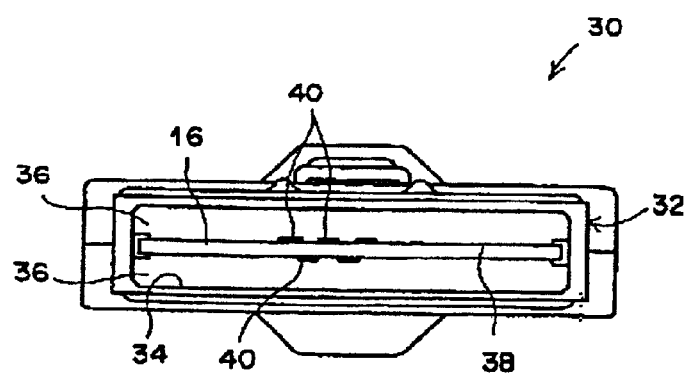
FIG. 6 is a front view of a male connector with the board showing one example of an application of the electrical cable terminal part structure and method.

One example of an application of the present invention is shown in FIG. 6. FIG. 6 is a front view of a male connector (plug connector) having a board 16 disposed with cables 1. A rectangular opening 34 is formed facing rearward in the housing 32 of the male connector 30. A pair of ribs 36, 36 are formed on the inside surfaces of the opening 34 so that the ribs protrude facing each other across the entire width of the opening 34 in a direction perpendicular to the direction of insertion of the male connector 30. A slot 38 formed between the ribs 36, 36 extends across the entire width of the opening 34. A board 16 having numerous contacts 40 is inserted and held in the slot 38. Because it is sufficient if the contacts 40 have electrical continuity with the conductive pads 18, 18, 24, the contacts 40 are disposed on both surfaces of the board in a positional relationship. The tip end portions of the contacts 40 are exposed inside the opening 34 and constitute contact parts that make contact with the contacts of a second connector (not shown) that is engaged with the male connector 30.

While the present invention has been described in connection with the illustrated embodiments, it will be appreciated and understood that modifications may be made without departing from the true spirit and scope of the invention. For example, it would also be possible to install the conductive pads 18, 18, 24 on the same side of the board, and to connect the three electrical wires W of each cable 1 to these conductive pads.

We claim:

1. A structure for terminating an electrical cable comprising:
   a circuit board;
   two differential transmission signal wires having respective core wires each with an outer insulating covering;
   a single drain wire disposed adjacent to the differential transmission signal wires at an equal distance from each of the differential transmission signal wires;
   a shielding covering that surrounds the differential transmission signal wires and the drain wire;
   an exposed area formed by stripping the shielding covering around the two differential transmission signal wires and the drain wire at a terminal part of the electrical cable; and
   a heat-shrink tube covering a portion of the shielding covering and exposed area, except for a front end portion of the differential transmission signal wires and the drain wire, so that the equal distances between the differential transmission signal wires and the drain wire inside the shielding covering are maintained in the exposed area by the heat-shrink tube and the differential transmission signal wires and the drain wire are positioned on the circuit board such that the front end portions of the differential transmission signal wires are positioned on a first side of the circuit board and the front end portion of the drain wire is positioned a second side of the circuit board; wherein the drain wire is positioned on the circuit board at an intermediate point between the differential transmission signal wires.

2. The structure of claim 1, wherein the differential transmission signal wires and the drain wire are twisted together inside the shielding covering.

3. The structure of claim 1, wherein the drain wire is a single wire.

4. The structure of claim 1, wherein the drain wire is formed from a plurality of wires twisted together.

5. The structure of claim 1, wherein the heat shrink tube extends over the exposed area to a position proximate the circuit board.

6. The structure of claim 1, wherein, the shielding covering has an insulating outer layer consisting of a polyester film.

7. The structure of claim 1, wherein, the outer insulating covering of the respective core wires of the differential transmission signal wires consists of a polyolefin-type resin.

8. The structure of claim 7, wherein, the drain wire is located in a position that is separated from the core wires of the differential transmission signal wires by a distance corresponding roughly to the thickness of the outer insulating covering of the core wires.

9. The structure of claim 6, wherein, the insulating outer layer of the shielding covering has an inside surface covered by an aluminum foil.

10. The structure of claim 9, wherein the drain wire contacts the aluminum foil.

11. A method for terminating an electrical cable, the method comprising:

stripping a shielding covering over a given length from an end portion of two differential transmission signal wires and a drain wire at a terminal part of the electrical cable;

covering an area around the two differential transmission signal wires and the drain wire that are exposed by stripping with a heat-shrink tube to maintain the drain wire at an equal distance from the two differential transmission signal wires to maintain impedance of the stripped wires;

exposing the front end portions exposed by the stripping of the differential transmission signal wires and the drain wire; and attaching the front end portions of the differential transmission signal wires on a first side of a circuit board and the front end portion of the drain wire on a second side of the circuit board wherein the drain wire is attached at an intermediate point between the differential transmission signal wires.

12. An electrical cable terminal part structure, comprising:

an electrical cable having a single drain wire and differential transmission signal wires with a differential impedance, and a stripped end exposing an outer surface of the wires; and a tube positioned over a portion of the electrical cable and a portion of the outer surface of the wires that maintains the differential impedance of the wires having an exposed outer surface, front end portions of the differential transmission signal wires being attached a first side of a circuit board and a front end portion of the drain wire being attached to a second side of the circuit board wherein the drain wire is attached at an equal distance from the differential transmission signal wires.

13. The electrical cable terminal part structure of claim 12, wherein the tube extends over the outer surface of the wires to a position proximate the circuit board.

* * * * *